US010483525B2

United States Patent
Kasamatsu et al.

(10) Patent No.: US 10,483,525 B2
(45) Date of Patent: Nov. 19, 2019

(54) NON-AQUEOUS ELECTROLYTE SECONDARY BATTERY

(71) Applicant: SANYO ELECTRIC CO., LTD., Daito-shi, Osaka (JP)

(72) Inventors: Shinji Kasamatsu, Tokushima (JP); Na Wang, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/558,307

(22) PCT Filed: Mar. 9, 2016

(86) PCT No.: PCT/JP2016/001294
§ 371 (c)(1),
(2) Date: Sep. 14, 2017

(87) PCT Pub. No.: WO2016/152056
PCT Pub. Date: Sep. 29, 2016

(65) Prior Publication Data
US 2018/0062160 A1    Mar. 1, 2018

(30) Foreign Application Priority Data

Mar. 24, 2015  (JP) ................. 2015-061386

(51) Int. Cl.
*H01M 4/13*   (2010.01)
*H01M 4/134*  (2010.01)
(Continued)

(52) U.S. Cl.
CPC .......... *H01M 4/134* (2013.01); *C08F 220/56* (2013.01); *C08K 3/04* (2013.01); *C08K 3/36* (2013.01);
(Continued)

(58) Field of Classification Search
CPC ........ H01M 4/134; H01M 4/13; H01M 4/133; H01M 4/36; H01M 4/386; H01M 4/62;
(Continued)

(56) References Cited

U.S. PATENT DOCUMENTS 4,877,688 A * 10/1989 Senoo ................. B41M 5/5254
428/32.14
6,482,545 B1 * 11/2002 Skotheim ............ H01M 10/052
429/217
(Continued)

FOREIGN PATENT DOCUMENTS

JP    2000-348730 A    12/2000
JP    2003-268053 A    9/2003
(Continued)

OTHER PUBLICATIONS

International Search Report dated Jun. 7, 2016, issued in counterpart of International Application No. PCT/JP2016/001294 (2 pages).

*Primary Examiner* — Amanda C. Walke
(74) *Attorney, Agent, or Firm* — Westerman, Hattori, Daniels & Adrian, LLP

(57) ABSTRACT

A non-aqueous electrolyte secondary battery having a long cycle life and generates a small amount of gas during, for example, storage in a charged state. A negative electrode in a non-aqueous electrolyte secondary battery according to an exemplary embodiment includes a negative electrode current collector and a negative electrode mixture layer formed on the negative electrode current collector. The negative electrode mixture layer contains a water-soluble polymer and a negative electrode active material containing a silicon-based active material. The water-soluble polymer contains 0.30 mol/100 g or more and 0.40 mol/100 g or less of an acrylic acid monomer unit and $10^{-4}$ mol/100 g or more and $10^{-3}$ mol/100 g or less of a tetrafunctional (meth)acrylate monomer unit. An aqueous solution containing 1% by mass (Continued)

of the polymer in terms of solid content has a viscosity of 0.05 Pa·s or higher and 0.70 Pa·s or lower.

7 Claims, 2 Drawing Sheets

(51) Int. Cl.
| | |
|---|---|
| *H01M 4/60* | (2006.01) |
| *H01M 4/583* | (2010.01) |
| *H01M 4/62* | (2006.01) |
| *H01M 4/133* | (2010.01) |
| *H01M 4/36* | (2006.01) |
| *C08F 220/56* | (2006.01) |
| *C08K 3/04* | (2006.01) |
| *C08K 3/36* | (2006.01) |
| *H01M 4/38* | (2006.01) |
| *H01M 4/02* | (2006.01) |
| *H01M 10/052* | (2010.01) |

(52) U.S. Cl.
CPC .............. *H01M 4/13* (2013.01); *H01M 4/133* (2013.01); *H01M 4/36* (2013.01); *H01M 4/386* (2013.01); *H01M 4/583* (2013.01); *H01M 4/602* (2013.01); *H01M 4/62* (2013.01); *H01M 4/621* (2013.01); *H01M 4/622* (2013.01); *C08K 2201/001* (2013.01); *H01M 10/052* (2013.01); *H01M 2004/027* (2013.01)

(58) Field of Classification Search
CPC ...... H01M 4/583; H01M 4/602; H01M 4/621; H01M 4/622; H01M 10/052
USPC ....................................................... 429/231.8
See application file for complete search history.

(56) References Cited

U.S. PATENT DOCUMENTS

| | | | | |
|---|---|---|---|---|
| 6,489,062 | B1 | 12/2002 | Watanabe et al. | |
| 9,413,011 | B2* | 8/2016 | Kang | H01M 4/622 |
| 2003/0031923 | A1* | 2/2003 | Aoshima | H01M 2/021 |
| | | | | 429/127 |
| 2005/0053843 | A1* | 3/2005 | Takahashi | H01M 10/0525 |
| | | | | 429/329 |
| 2009/0246635 | A1* | 10/2009 | Takano | H01M 10/0525 |
| | | | | 429/231.95 |
| 2013/0216906 | A1* | 8/2013 | Kang | H01M 4/622 |
| | | | | 429/211 |
| 2015/0137030 | A1* | 5/2015 | Matsuo | C08L 33/14 |
| | | | | 252/182.1 |
| 2017/0062828 | A1* | 3/2017 | Sonobe | H01M 4/13 |

FOREIGN PATENT DOCUMENTS

| | | |
|---|---|---|
| JP | 3703667 B2 | 10/2005 |
| JP | 2014/014006 A1 | 1/2014 |
| JP | 2014/098233 A1 | 6/2014 |
| JP | 2014-160638 A | 9/2014 |
| JP | 2015/133154 A1 | 9/2015 |
| JP | 2015/186363 A1 | 12/2015 |
| JP | 2016/067635 A1 | 5/2016 |
| WO | WO-2011148970 A1 * | 12/2011 ............ H01M 4/134 |

* cited by examiner

NON-AQUEOUS ELECTROLYTE SECONDARY BATTERY

TECHNICAL FIELD

The present disclosure relates to non-aqueous electrolyte secondary batteries.

BACKGROUND ART

Silicon materials, such as silicon (Si) and silicon oxide represented by $SiO_x$, are known to intercalate more lithium ions per unit volume than carbon-based materials, such as graphite. For example, Patent Literature 1 and Patent Literature 2 disclose non-aqueous electrolyte secondary batteries that have a negative electrode containing a silicon-based active material and in which polyacrylic acid is used as a binder in the negative electrode mixture layer. Since silicon materials undergo a larger volume change associated with charging and discharging than graphite, the combined use of graphite and a silicon-based active material has been proposed in order to improve the capacity of batteries and maintain a favorable cycle life.

CITATION LIST

Patent Literature

PTL 1: Japanese Published Unexamined Patent Application No. 2000-348730
PTL 2: Japanese Patent No. 3703667

SUMMARY OF INVENTION

Technical Problem

There is a need to improve the cycle life of non-aqueous electrolyte secondary batteries including a high-capacity negative electrode containing a silicon-based active material. The related art including the techniques disclosed in Patent Literature 1 and Patent Literature 2 still has room for improvement. In non-aqueous electrolyte secondary batteries including a silicon-based active material, a large amount of gas is generated as a result of decomposition of the non-aqueous electrolyte, and such generation of gas needs to be suppressed.

Solution to Problem

A non-aqueous electrolyte secondary battery in an aspect of the present disclosure includes a positive electrode, a negative electrode, and a non-aqueous electrolyte. The negative electrode includes a negative electrode current collector and a negative electrode mixture layer formed on the current collector. The negative electrode mixture layer contains a water-soluble polymer and a negative electrode active material containing a silicon-based active material. The water-soluble polymer includes 0.30 mol/100 g or more and 0.40 mol/100 g or less of an acrylic acid monomer unit and $10^{-4}$ mol/100 g or more and $10^{-3}$ mol/100 g or less of a tetrafunctional (meth)acrylate monomer unit. An aqueous solution containing 1% by mass of the polymer in terms of solid content has a viscosity of 0.05 Pa·s or higher and 0.70 Pa·s or lower.

Advantageous Effects of Invention

According to an aspect of the present disclosure, a non-aqueous electrolyte secondary battery includes a high-capacity negative electrode containing a silicon-based active material. The non-aqueous electrolyte secondary battery has a long cycle life and generates a small amount of gas during, for example, storage in a charged state.

DESCRIPTION OF EMBODIMENTS

Figure 1:
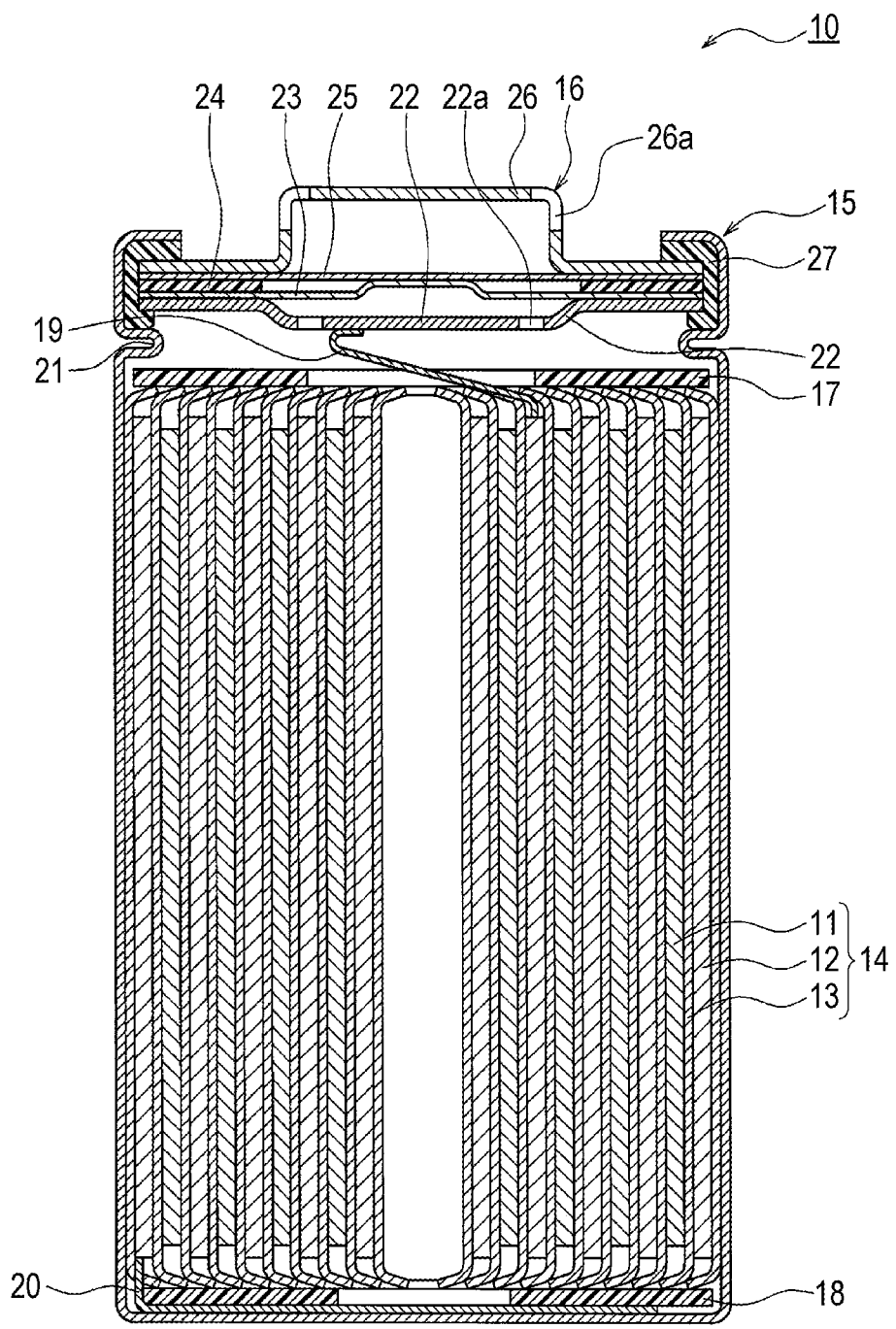
FIG. 1 is a sectional view of a non-aqueous electrolyte secondary battery in an exemplary embodiment.

It is an important issue to improve the cycle life and storage stability of a non-aqueous electrolyte secondary battery while improving the capacity of the battery. The inventors of the present disclosure have found that a long cycle life and less gas generation during storage in a charged state are achieved by using the water-soluble polymer as a binder in the negative electrode mixture layer including a high-capacity negative electrode containing a silicon-based active material.

In the negative electrode containing a silicon-based active material, a large change in the volume of the negative electrode mixture layer associated with charging and discharging may weaken the degree of contact or degrade the conditions of contact between active material particles to increase the number of active material particles isolated from conductive paths in the negative electrode mixture layer, which may shorten the cycle life. Although the side reaction between the active material and the non-aqueous electrolyte is suppressed by formation of an SEI coating film on the surface of the negative electrode active material during initial charging, a large change in the volume of the active material associated with charging and discharging tends to create fresh surfaces of the active material on which the SEI coating film is not formed after initial charging and discharging. Thus, the side reaction between the active material and the non-aqueous electrolyte may occur on the fresh surfaces, which increases the amount of generated gas.

In the negative electrode of the non-aqueous electrolyte secondary battery according to the present disclosure, the water-soluble polymer mixed in the negative electrode mixture layer may significantly improve the bonding strength between active material particles and may also maintain good conditions of contact between active material particles after repeated charge/discharge cycles. Therefore, in the non-aqueous electrolyte secondary battery including the negative electrode according to the present disclosure, the number of active material particles isolated from the conductive paths is reduced, which improves the cycle life. In addition, the amount of generated gas is reduced by suppressing formation of fresh interfaces. A reduced amount of generated gas contributes to an improved cycle life.

The water-soluble polymer includes predetermined amounts of an acrylic acid monomer unit and a tetrafunctional (meth)acrylate monomer unit. The aqueous solution containing 1% by mass of the water-soluble polymer in terms of solid content has a viscosity of 0.05 Pa·s or higher and 0.70 Pa·s or lower. This water-soluble polymer may have a polymer strength preferred for a binder particularly in the negative electrode mixture layer containing a silicon-based active material and can favorably be adsorbed onto the active material particles. These properties allow the water-soluble polymer to cover the surfaces of the active material particles widely and uniformly. This significantly increases, for example, the bonding strength between the active material particles to harden the negative electrode mixture layer and suppress a volume change associated with charging and discharging, which maintains favorable conductive paths even after repeated charge/discharge cycles. When the surfaces of the active material particles are widely and uniformly covered with the water-soluble polymer, the side reaction between the active material and the non-aqueous electrolyte may also be suppressed.

The expression "include a monomer unit" as used herein refers to "the polymer obtained by using the monomer includes a monomer-derived structural unit". The term "(meth)acrylate" refers to acrylate and/or methacrylate.

Hereinafter, an exemplary embodiment will be described in detail.

The drawings to which reference is made in the description of the embodiments are schematically illustrated. The dimensional ratios and the like of components in the drawings may be different from actual dimensional ratios and the like. Specific dimensional ratios and the like should be determined in consideration of the following descriptions.

FIG. 1 is a sectional view of a non-aqueous electrolyte secondary battery 10 in an exemplary embodiment.

The non-aqueous electrolyte secondary battery 10 includes a positive electrode 11, a negative electrode 12, and a non-aqueous electrolyte. A separator 13 is interposed between the positive electrode 11 and the negative electrode 12. The non-aqueous electrolyte secondary battery 10 has, for example, a structure in which the non-aqueous electrolyte and a wound-type electrode body 14 formed by winding the positive electrode 11 and the negative electrode 12 with the separator 13 interposed therebetween are placed in a battery case. Other types of electrode bodies, such as a stacked-type electrode body formed by alternately stacking positive electrodes and negative electrodes with separators individually interposed therebetween, may be employed instead of the wound-type electrode body 14. Examples of the battery case containing the electrode body 14 and the non-aqueous electrolyte include a metal case having, for example, a cylindrical shape, a prismatic shape, a coin shape, or a button shape, and a resin case formed by laminating resin sheets (laminate-type battery). In the example illustrated in FIG. 1, the battery case has a case body 15 having a bottomed cylindrical shape and a sealing body 16.

The non-aqueous electrolyte secondary battery 10 includes insulating plates 17 and 18, which are disposed on and under the electrode body 14, respectively. In the example illustrated in FIG. 1, a positive electrode lead 19 attached to the positive electrode 11 passes through a through-hole of the insulating plate 17 and extends toward the sealing body 16, whereas a negative electrode lead 20 attached to the negative electrode 12 passes outside the insulating plate 18 and extends toward the bottom of the case body 15. For example, the positive electrode lead 19 is connected by welding or the like to the lower surface of a filter 22, which is a bottom plate of the sealing body 16. A cap 26 is a top plate of the sealing body 16 and is electrically connected to the filter 22. The cap 26 serves as a positive electrode terminal. The negative electrode lead 20 is connected by welding or the like to the bottom inner surface of the case body 15. The case body 15 serves as a negative electrode terminal. In this embodiment, the sealing body 16 has a current interrupt device (CID) and a gas release mechanism (safety valve). The case body 15 preferably has a gas release valve at its bottom.

The case body 15 is, for example, a metal container having a bottomed cylindrical shape. A gasket 27 is interposed between the case body 15 and the sealing body 16 to ensure sealing of the battery case. The case body 15 preferably has, for example, a projecting portion 21 which is formed by pressing the side surface from outside and which supports the sealing body 16. The projecting portion 21 is preferably formed annularly in the circumferential direction of the case body 15 and supports the sealing body 16 on its upper surface.

The sealing body 16 has the filter 22 having a filter opening 22a and valve bodies disposed on the filter 22. The valve bodies close the filter opening 22a of the filter 22 and fracture when heat generation caused by an internal short circuit or the like increases the internal pressure of the battery. In this embodiment, a lower valve body 23 and an upper valve body 25 are provided as valve bodies. An insulating member 24 interposed between the lower valve body 23 and the upper valve body 25, and the cap 26 having a cap opening 26a are provided. The members that constitute the sealing body 16 have, for example, a disc shape or ring shape. The members other than the insulating member 24 are electrically connected to one another. Specifically, the filter 22 and the lower valve body 23 are connected to each other at their peripheries, and the upper valve body 25 and the cap 26 are also connected to each other at their peripheries. The lower valve body 23 and the upper valve body 25 are connected to each other at their center portions, and the insulating member 24 is interposed between the peripheries. When heat generation caused by an internal short circuit or the like increases the internal pressure, for example, the lower valve body 23 fractures at its thin part. This causes the upper valve body 25 to curve toward the cap 26 and come apart from the lower valve body 23, which breaks the electrical connection between the lower valve body 23 and the upper valve body 25.

[Positive Electrode]

The positive electrode includes a positive electrode current collector and a positive electrode mixture layer formed on the current collector. As the positive electrode current collector, for example, a foil made of a metal, such as aluminum, stable in the potential range of the positive electrode or a film having the surface layer made of the metal can be used. The positive electrode mixture layer preferably contains a conductive material and a binder (positive electrode binder) in addition to a positive electrode active material. The positive electrode can be produced as follows: for example, applying a positive electrode mixture slurry containing a positive electrode active material, a conductive material, a positive electrode binder, and the like onto the positive electrode current collector to form coating films, and drying the coating films; and then performing rolling to form a positive electrode mixture layer on each surface of the current collector.

Examples of the positive electrode active material include lithium composite oxides containing Li and metal element M. The metal element M is preferably a transition metal element, such as Co, Ni, or Mn, and the positive electrode active material is preferably a lithium transition metal oxide. The lithium transition metal oxide may contain metal element M other than transition metals. Examples of metal element M include Co, Ni, and Mn as well as Mg, Sc, Y, Fe, Cu, Zn, Al, Cr, Pb, Sb, and B. These metal elements may be used alone or in a mixture of two or more. The surfaces of the positive electrode active material particles may be covered with microparticles made of an inorganic compound, for example, an oxide, such as aluminum oxide ($Al_2O_3$), a phosphate compound, or a borate compound.

The lithium transition metal oxide may be a composite oxide containing more than 30 mol % of nickel (Ni) relative to the total amount by mole of metal elements other than lithium (Li). The proportion (amount) of Ni in the lithium transition metal oxide is, for example, 80 mol % or more. Specific examples of the lithium transition metal oxide include Ni—Co—Mn composite oxides and Ni—Co—Al composite oxides represented by general formula $Li_aC_{x-}Ni_yM_{1-x-y}O_2$ ($0.9 \leq a \leq 1.2$, $0.01 \leq x < 0.2$, $0.8 \leq y < 1.0$, $0 < x+y < 1$, and M represents at least one metal element selected from Mn and Al) in a discharged state or an unreacted state.

The conductive material increases the electrical conductivity of the positive electrode mixture layer. Examples of the conductive material include carbon materials, such as carbon black, acetylene black, Ketjenblack, and graphite. These conductive materials may be used alone or in combination of two or more.

The positive electrode binder maintains good conditions of contact between the positive electrode active material and the conductive material and increases the bonding strength between, for example, the active material particles and the surface of the positive electrode current collector. Examples of the positive electrode binder include fluorine resins, such as polytetrafluoroethylene (PTFE) and polyvinylidene fluoride (PVdF), polyacrylonitrile (PAN), a polyimide resin, an acrylic resin, and a polyolefin resin. These resins may be used in combination with a cellulose derivative, such as carboxymethyl cellulose (CMC) or its salt (may be a partially neutralized salt, such as CMC-Na, CMC-K, or CMC-$NH_4$), or polyethylene oxide (PEO). These cellulose derivatives may be used alone or in combination of two or more.

[Negative Electrode]

Figure 2:
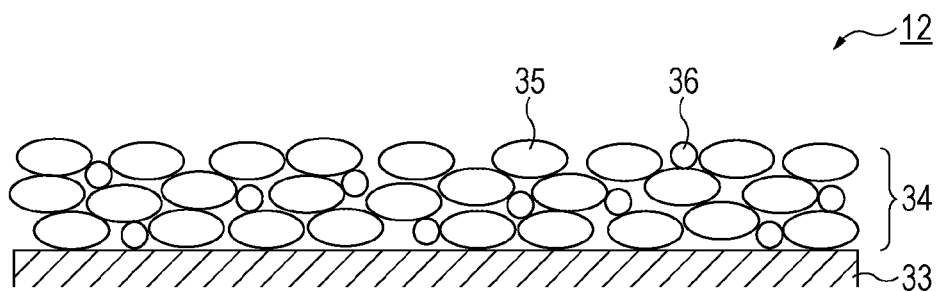
FIG. 2 is a sectional view of a negative electrode in an exemplary embodiment.

FIG. 2 is a sectional view of the negative electrode 12 in an exemplary embodiment.

The negative electrode 12 includes a negative electrode current collector 33 and a negative electrode mixture layer 34 formed on the current collector. As the negative electrode current collector 33, for example, a foil made of a metal, such as copper, stable in the potential range of the negative electrode 12 or a film having the surface layer made of the metal can be used. The negative electrode mixture layer 34 illustrated in FIG. 2 contains a carbon-based active material 35, a silicon-based active material 36, and a particular water-soluble polymer (hereinafter referred to as a "water-soluble polymer A"). The water-soluble polymer A includes an acrylic acid monomer unit, which is a repeating unit derived from an acrylic acid monomer, and a tetrafunctional (meth)acrylate monomer unit, which is a repeating unit derived from a tetrafunctional (meth)acrylate monomer, in predetermined amounts (mol) per 100 g of the polymer. The negative electrode 12 can be produced as follows: for example, applying a negative electrode mixture slurry containing the carbon-based active material 35, the silicon-based active material 36, the water-soluble polymer A (an aqueous solution of the water-soluble polymer A, which is a binder composition described below), and the like onto the negative electrode current collector 33 to form coating films; drying the coating films; and then performing rolling to form the negative electrode mixture layer 34 on each surface of the current collector.

The example illustrated in FIG. 2 indicates an embodiment in which the carbon-based active material 35 and the silicon-based active material 36 are used in combination as negative electrode active materials. However, as a negative electrode active material, only a silicon-based active material may be used, or a silicon-based active material may be used in combination with a carbon-based active material, a metal or alloy material to be alloyed with lithium, a metal composite oxide or the like. The combined use of a silicon-based active material and a carbon-based active material tends to reduce a change in the volume of the negative electrode mixture layer 34 associated with charging and discharging.

When the carbon-based active material 35 and the silicon-based active material 36 are used in combination as negative electrode active materials, the mass ratio of the carbon-based active material 35 to the silicon-based active material 36 is preferably from 95:5 to 70:30 and more preferably from 95:5 to 80:20. When the mass ratio of the carbon-based active material 35 to the silicon-based active material 36 is within the above-described range, both high capacity and long cycle life tend to be obtained.

As the carbon-based active material 35, for example, graphite and hard carbon, which have been used as negative electrode active materials, can be used. Examples of the graphite include natural graphite, such as scaly graphite, massive graphite, and earthy graphite; and artificial graphite, such as massive artificial graphite (MAG) and graphitized mesophase carbon microbeads (MCMB). These types of graphite may be used alone or in combination of two or more as the carbon-based active material 35. The average particle size of graphite particles is, for example, 1 to 30 μm. The average particle size of graphite particles refers to the volume average particle size (Dv50) at 50% of the cumulative volume in the particle-size distribution determined by a laser diffraction/scattering method. The average particle size of graphite particles can be determined by using, for example, LA-750 available from HORIBA, Ltd. (the same applies to the silicon-based active material 36).

The silicon-based active material 36 contains at least one of silicon (Si) and silicon compounds. The silicon-based active material 36 may be composed only of Si and is preferably composed of a silicon oxide represented by $SiO_x$ ($0.5 \leq x \leq 1.5$). Silicon compounds and the like may be used alone or in combination of two or more in the silicon-based active material 36. The surfaces of $SiO_x$ particles are preferably covered with a conductive coating film formed of a material having higher conductivity than $SiO_x$. The average particle size (Dv50) of $SiO_x$ is, for example, 1 to 15 μm, which is smaller than Dv50 of graphite particles.

$SiO_x$ has, for example, a structure in which Si is dispersed in an amorphous $SiO_2$ matrix. The presence of dispersed Si can be determined through observation of the cross section of $SiO_x$ particles with a transmission electron microscope (TEM). The $SiO_x$ particles may contain lithium silicate (e.g., lithium silicate represented by $Li_{2z}SiO_{(2+z)}$ ($0<z<2$)) or may have a structure in which Si is dispersed in the lithium silicate phase.

The material that forms the conductive coating film is preferably electrochemically stable and is preferably at least one selected from the group consisting of a carbon material, a metal, and a metal compound. In particular, a carbon material is preferably used. A carbon coating film is formed, for example, in an amount of 0.5% to 10% by mass relative to the mass of the $SiO_x$ particles. Examples of the method for forming the carbon coating film include a method of heating a mixture of coal tar or the like and $SiO_x$ particles and a chemical vapor deposition method (CVD method) using hydrocarbon gas or the like. A carbon coating film may be formed by attaching carbon black, Ketjenblack, or the like to the surfaces of the $SiO_x$ particles using a binder.

[Water-Soluble Polymer A]

The water-soluble polymer A adheres to the surface of the negative electrode active material and has functions of maintaining good conditions of contact between active material particles and increasing the bonding strength between the negative electrode active material or the like and the surface of the negative electrode current collector 33. In other words, the water-soluble polymer A functions as a binder (negative electrode binder). The water-soluble polymer A is preferably a main component of the binder and is contained in the binder in an amount of 50% by mass or more relative to the total mass of binder components. The negative electrode binder may be composed only of the water-soluble polymer A.

The water-soluble polymer A includes 0.30 mol/100 g or more and 0.40 mol/100 g or less of an acrylic acid monomer unit and $10^{-4}$ mol/100 g or more and $10^{-3}$ mol/100 g or less of a tetrafunctional (meth)acrylate monomer unit. An aqueous solution containing 1% by mass of the polymer in terms of solid content has a viscosity of 0.05 Pa·s or higher and 0.70 Pa·s or lower. The use of the water-soluble polymer A as a negative electrode binder may maintain good conditions of contact between the active material particles, reduce the amount of gas generated during, for example, storage in a charged state, and improve the cycle life even if the silicon-based active material 36 swells or shrinks.

As used herein, the term "water-soluble" regarding the water-soluble polymer A means that, when a mixture obtained by adding 0.5 parts by mass (in terms of solid content) of the polymer per 100 parts by mass of ion-exchanged water and stirring the mixture is controlled to meet at least one of conditions where the temperature is in the range of 23° C. or higher and 27° C. or lower and the pH is in the range of 7.5 or higher and 8.5 or lower (a NaOH aqueous solution and/or an HCl aqueous solution are used for pH adjustment) and the mixture is passed through a 250 mesh screen, the mass of the solids in the residue that fails to pass through the screen and remains on the screen is not more than 10% by mass relative to the solids of the polymer added.

(Acrylic Acid Monomer Unit)

Examples of the acrylic acid monomer that forms the acrylic acid monomer unit include acrylic acid and salts thereof. These monomers may be used alone or in combination of two or more at any ratio. The amount of the acrylic acid monomer unit in the water-soluble polymer A is 0.30 mol/100 g or more and 0.40 mol/100 g or less and preferably 0.32 mol/100 g or more and 0.35 mol/100 g or less. If the amount of the acrylic acid monomer unit in the water-soluble polymer A is less than 0.30 mol/100 g, the cycle life is not satisfactory. If the amount of the acrylic acid monomer unit in the water-soluble polymer A is more than 0.40 mol/100 g, the storage stability is low.

(Tetrafunctional (Meth)Acrylate Monomer Unit)

The tetrafunctional (meth)acrylate monomer that forms the tetrafunctional (meth)acrylate monomer unit is a (meth)acrylate in which the number of ethylenic unsaturated bonds (functionality) is 4. Examples of the tetrafunctional (meth)acrylate monomer include ethoxylated pentaerythritol tetraacrylate represented by general formula (I) below:

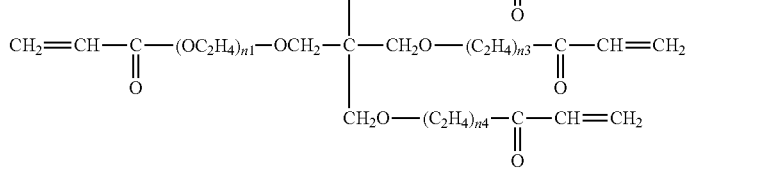

[Chem. 1]

[wherein n1, n2, n3, and n4 represent an integer of 2 or greater and may be the same or different from each other]. These monomers may be used alone or in combination of two or more at any ratio. The amount of the tetrafunctional (meth)acrylate monomer unit in the water-soluble polymer A is $10^{-4}$ mol/100 g or more and $10^{-3}$ mol/100 g or less, and preferably $2.0 \times 10^{-4}$ mol/100 g or more and $9.0 \times 10^{-4}$ mol/100 g or less. If the amount of the tetrafunctional (meth)acrylate monomer unit in the water-soluble polymer A is less than $10^{-4}$ mol/100 g, the cycle life is not satisfactory. If the amount of the tetrafunctional (meth)acrylate monomer unit in the water-soluble polymer A is more than $10^{-3}$ mol/100 g, the storage stability is low.

(Other Monomer Units)

The water-soluble polymer A may include monomer units other than the acrylic acid monomer unit and the tetrafunctional (meth)acrylate monomer unit. The monomers that form other monomer units are not limited unless the advantageous effects of the present disclosure are impaired. Examples of the monomers that form other monomer units include acrylates, methacrylates, 2-hydroxyethyl acrylate, styrene, vinyl acetate, glycidyl methacrylate, 2-pyridyl pyridine, acrylamide, methacrylamide, dimethylacrylamide, dimethylmethacrylamide, isopropylacrylamide, acrylonitrile, methacrylonitrile, and 2-acrylamido-2-2 methylpropanesulfonic acid. These monomers may be used alone or in combination of two or more at any ratio.

An aqueous solution containing 1% by mass of the water-soluble polymer A in terms of solid content has a viscosity of 0.05 Pa·s or higher and 0.70 Pa·s or lower. The viscosity of the aqueous solution is measured by the method described below in Examples using a rotation-type rheometer (MCR 30 available from Anton Paar Japan K.K.). The viscosity of the aqueous solution containing 1% by mass of the water-soluble polymer A in terms of solid content is preferably 0.10 Pa·s or more and 0.65 Pa·s or less, and more preferably 0.10 Pa·s or more and 0.60 Pa·s or less. If the viscosity is less than 0.05 Pa·s, the cycle life is not satisfactory. If the viscosity is more than 0.70 Pa·s, it is difficult to uniformly cover the surfaces of the negative electrode active material particles with the water-soluble polymer A, which results particularly in low storage stability.

The viscosity of the aqueous solution containing 1% by mass of the water-soluble polymer A in terms of solid content can be controlled by a known method, for example, by changing the weight-average molecular weight of the water-soluble polymer A. Specifically, the viscosity can be increased by increasing the weight-average molecular weight of the water-soluble polymer, whereas the viscosity can be reduced by reducing the weight-average molecular weight of the water-soluble polymer.

(Preparation Method)

The method for preparing the water-soluble polymer A is not limited. The water-soluble polymer A is prepared, for example, by causing, in an aqueous solvent, polymerization of a monomer composition containing the monomers described above. The amount (mol/100 g) of each monomer in the total amount of monomers in the monomer composition is normally equal to the amount (mol/100 g) of each monomer unit in a desired water-soluble polymer. The polymerization method is not limited and any method, such as a solution polymerization method, a suspension polymerization method, a bulk polymerization method, or an emulsion polymerization method, can be used. As a polymerization reaction, any reaction, such as ionic polymerization, radical polymerization, or living radical polymerization, can be used. For polymerization, a known emulsifier, a known polymerization initiator, and the like can be used as desired. When the monomer composition is subjected to polymerization in an aqueous solvent, an aqueous solution containing the obtained water-soluble polymer A may be used, as it is, as the negative electrode binder composition to be added to a negative electrode mixture slurry. The negative electrode mixture slurry can be prepared by mixing a negative electrode active material powder and the binder composition and stirring the mixture.

The negative electrode binder composition, which is an aqueous solution of the water-soluble polymer A, contains water as a main component of the solvent. As the solvent, only water may be used, or a solvent mixture containing water and an organic solvent compatible with water may also be used. At least part of the solvent in the binder composition is not limited and may be composed of a polymerization solvent (e.g., water) contained in the monomer composition used to prepare the water-soluble polymer. The pH of the aqueous solution containing 1% by mass of the water-soluble polymer A in terms of solid content is preferably 7.5 or more and 8.5 or less. When the pH is within the above-described range, it is easy to handle the binder composition.

The negative electrode binder composition may contain additive components, such as a thickener (except for one corresponding to the water-soluble polymer A) and a leveling agent, in addition to the components described above. These additive components are not limited as long as they do not affect the battery reactions, and known additive components can be used. These components may be used alone or in combination of two or more at any ratio.

The negative electrode binder may further contain a resin (binder component) other than the water-soluble polymer A. However, the main component of the negative electrode binder is preferably the water-soluble polymer A as described above. The binder component used in combination with the water-soluble polymer A is not limited unless the advantageous effects of the present disclosure are impaired. Examples of the binder component include styrene-butadiene copolymer (SBR), cellulose resins such as carboxymethyl cellulose (CMC) and methyl cellulose, and polyvinyl alcohol. These binder components may be used alone or in combination of two or more.

The amount of the water-soluble polymer A in the negative electrode mixture layer 34 is preferably 1% to 7% by mass, more preferably 2% to 6% by mass, and still more preferably 3% to 5% by mass relative to the mass of the negative electrode active material. When the amount of the water-soluble polymer A is 1% to 7% by mass, it is easy to maintain good conditions of contact between the active material particles even after charging and discharging, which tends to provide a long cycle life and high storage stability.

The water-soluble polymer A can favorably be adsorbed onto the surfaces of the negative electrode active material particles as described above and may cover the surfaces of the active material particles widely and uniformly. This improves the adhesion strength between the negative electrode active material particles and provides the hard negative electrode mixture layer 34. The hardness of the negative electrode mixture layer 34 can be evaluated by stiffness testing of the negative electrode 12. For example, the yield stress of the negative electrode mixture layer 34 obtained by stiffness testing is 100 mN or more and preferably 130 mN or more. The yield stress is preferably 300 mN or less in order to prevent separation of the mixture in an electrode bending process or other processes. The yield stress in stiffness testing is measured by the method described below in Examples.

[Separator]

An insulating porous sheet having ion permeability is used as a separator. Specific examples of the porous sheet include a microporous thin film, a woven fabric, and a non-woven fabric. Examples of suitable materials of the separator include polyolefin resins, such as polyethylene and polypropylene, and cellulose. The separator may be a stacked body having a cellulose fiber layer and a thermoplastic resin fiber layer made of polyolefin resin or the like. The separator may be a multilayer separator including a polyethylene layer and a polypropylene layer or may have the surface covered with an aramid-based resin or the like. The thickness of the separator is, for example, about 10 to 20 m.

A filler layer containing an inorganic filler may be formed on at least one of the interface between the separator and the positive electrode and the interface between the separator and the negative electrode. Examples of the inorganic filler include a phosphate compound and an oxide containing, for example, at least one selected from Ti, Al, Si, and Mg. The filler layer can be formed by, for example, applying a slurry containing the filler onto the surface of the positive electrode, the negative electrode, or the separator.

[Non-Aqueous Electrolyte]

A non-aqueous electrolyte contains a non-aqueous solvent and an electrolyte salt dissolved in the non-aqueous solvent. As the non-aqueous solvent, for example, esters, ethers, nitriles such as acetonitrile, amides such as dimethylformamide, and a solvent mixture of two or more of these can be used. The non-aqueous solvent may contain a halogenated product obtained by substituting at least part of hydrogen atoms of such a solvent with halogen atoms such as a fluorine atom.

Examples of the esters include cyclic carbonates, such as ethylene carbonate (EC), propylene carbonate (PC), and butylene carbonate; chain carbonates, such as dimethyl carbonate (DMC), methyl ethyl carbonate (EMC), diethyl carbonate (DEC), methylpropyl carbonate, ethylpropyl carbonate, and methyl isopropyl carbonate; cyclic carboxylates, such as γ-butyrolactone (GBL) and γ-valerolactone (GVL); and chain carboxylates, such as methyl acetate, ethyl acetate, propyl acetate, methyl propionate (MP), and ethyl propionate.

Examples of the ethers include cyclic ethers, such as 1,3-dioxolane, 4-methyl-1,3-dioxolane, tetrahydrofuran, 2-methyltetrahydrofuran, propylene oxide, 1,2-butyleneoxide, 1,3-dioxane, 1,4-dioxane, 1,3,5-trioxane, furan, 2-methylfuran, 1,8-cineole, and crown ether; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

As the halogenated product, for example, fluorinated cyclic carbonates, such as fluoroethylene carbonate (FEC); fluorinated chain carbonates; and fluorinated chain carboxylates, such as fluoromethyl propionate (FMP), are preferably used.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, chloroborane lithium, lower-aliphatic lithium carboxylates, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ (l and m represent an integer of 1 or greater). These lithium salts may be used alone or in a mixture of two or more. Of these lithium salts, $LiPF_6$ is preferably used from the viewpoint of ionic conductivity, electrochemical stability, and the like. The concentration of the lithium salt is preferably 0.8 to 1.8 mol per liter of the non-aqueous solvent.

EXAMPLES

The present disclosure will be further described below by way of Examples, but the present disclosure is not limited to these Examples.

Example 1

[Preparation of Negative Electrode Binder Composition a1]

To a 1 L flask with a septum, 1500 g of ion-exchanged water was added and heated to a temperature of 40° C. The flask was purged with nitrogen gas at a flow rate of 100 mL/min. Next, 10 g of ion-exchanged water, 23.51 g (25 parts per 100 parts of all the monomers, 0.326 mol/100 g) of acrylic acid, 1.69 g (1.69 parts per 100 parts of all the monomers, $8.92 \times 10^{-4}$ mol/100 g) of ethoxylated pentaerythritol tetraacrylate (EPETA, ATM-35E, available from Shin-Nakamura Chemical Co., Ltd., corresponding to compound (I) where n1+n2+n3+n4=35, functionality=4), 70.1 g (70.1 parts per 100 parts of all the monomers) of acrylamide, and 4.7 g (4.7 parts per 100 parts of all the monomers) of methyl acrylate were mixed and injected into the flask with a syringe. Subsequently, 8.0 g of a 2.5% aqueous solution of potassium persulfate was added as a polymerization initiator to the flask with a syringe. After 15 minutes, 40 g of a 2.0% aqueous solution of tetramethylethylenediamine was added as a polymerization accelerator with a syringe. At 4 hours after the first addition of potassium persulfate, 4.0 g of a 2.5% aqueous solution of potassium persulfate was added again to the flask, and 20 g of a 2.0% aqueous solution of tetramethylethylenediamine was further added, and the temperature was increased to 80° C. to promote the polymerization reaction. After 3 hours, the flask was opened to the air to terminate the polymerization reaction, the product was deodorized at a temperature of 80° C., and the residual monomers were removed. Thereafter, the pH of the product was adjusted to 8 by using a 10% aqueous solution of lithium hydroxide to produce a negative electrode binder composition a1 (an aqueous solution containing a water-soluble polymer A1).

[Preparation of Negative Electrode Mixture Slurry]

To a planetary mixer were added 90 parts by mass of artificial graphite (theoretical capacity: 360 mAh/g), 10 parts by mass of $SiO_x$ having a carbon coating film (x=0.97, theoretical capacity: 2300 mAh/g), and 3.0 parts by mass of a negative electrode binder composition a1 (solid content: 4.5%) in terms of solid content. The mixture was diluted with ion-exchanged water so as to obtain a solid content of 60%. The resulting mixture was then kneaded at a rotation speed of 40 rpm for 60 minutes to provide a paste-state slurry. Furthermore, 80 parts by mass of ion-exchanged water was added to the mixture so as to obtain a viscosity of 1100±100 mPa·s (B-type viscometer, the measurement conditions were the same as those for "viscosity for 1% by mass of solid content" described below, such that a negative electrode mixture slurry (solid content: 45% by mass) was prepared.

[Production of Negative Electrode]

The prepared negative electrode mixture slurry was applied, with a comma coater, to the surface of a copper foil having a thickness of 15 μm, the copper foil serving as a current collector, such that the coating amount was 8.4 to 9.0 mg/cm$^2$. For the copper foil to which the slurry had been applied, the slurry composition on the copper foil was dried by passing the copper foil through an oven at a temperature of 80° C. over 2 minutes and through an oven at a temperature of 110° C. over 2 minutes at a rate of 300 mm/s to produce a negative electrode original plate. The negative electrode original plate was pressed by a roll press machine so as to obtain a density of 1.58 to 1.62 g/cm$^3$. The pressed negative electrode original plate was placed in an environment at a temperature of 105° C. under a vacuum condition for 4 hours in order to remove water and further promote crosslinking, such that a negative electrode was obtained.

[Production of Positive Electrode]

To a planetary mixer were added 100 parts by mass of lithium cobalt oxide ($LiCoO_2$:LCO), 2 parts by mass of acetylene black (HS-100 available from Denka Company Limited), and 2 parts by mass of polyvinylidene fluoride (PVDF, KF-1100 available from Kureha Corporation). Furthermore, 2-methylpyrrolidone was added as a dispersion medium so as to obtain a total solid content of 67%, followed by mixing to prepare a positive electrode mixture slurry. The prepared positive electrode mixture slurry was applied, with a comma coater, onto an aluminum foil having a thickness of 20 μm, the aluminum foil serving as a current collector, such that the coating amount was 17.3 to 17.7 mg/cm$^2$. Subsequently, the aluminum foil to which the slurry composition had been applied was dried by passing the aluminum foil through an oven at a temperature of 60° C. over 2 minutes at a rate of 0.5 m/min. The aluminum foil was then heated at a temperature of 120° C. for 2 minutes to produce a positive electrode original plate. The positive electrode original plate was pressed by a roll press machine so as to have a density of 3.40 to 3.50 g/cm$^3$. The pressed positive electrode original plate was placed in an environment at a temperature of 120° C. under a vacuum condition for 3 hours in order to remove the dispersion medium, such that a positive electrode was obtained.

[Preparation of Non-Aqueous Electrolyte]

A non-aqueous electrolyte solution was prepared by adding 1.0 mol/L of lithium hexafluorophosphate ($LiPF_6$) to a solvent mixture containing ethylene carbonate (EC) and ethyl methyl carbonate (EMC) at a volume ratio of 3:7 and further adding 2 vol % (solvent proportion) of vinylene carbonate to the mixture.

[Production of Non-Aqueous Electrolyte Secondary Battery]

A wound-type electrode body was produced by attaching a tab to each of the positive electrode and the negative electrode and spirally winding the electrodes with a separator interposed therebetween such that the tab was located in an outermost periphery. The separator was a monolayer polypropylene separator. The electrode body was placed in a housing formed of an aluminum laminate sheet, and the obtained product was then vacuum-dried at 105° C. for 2 hours. The non-aqueous electrolyte solution was then injected, and the opening of the housing was sealed to produce a non-aqueous electrolyte secondary battery (laminate cell). The designed capacity of this battery is 800 mAh.

Examples 2 to 5

Negative electrode binder compositions a2 to a5 (aqueous solutions each containing each of water-soluble polymers A2 to A5) were prepared in the same manner as in Example 1 except that the monomers in Table 1 were used at the proportions shown in Table 1. Negative electrodes and batteries were produced in the same manner as in Example 1 except that the negative electrode binder compositions a2 to a5 were used instead of the negative electrode binder composition a1.

Example 6

A negative electrode and a battery were produced in the same manner as in Example 3 except that, in preparing a negative electrode mixture slurry, a negative electrode binder composition a3 was mixed such that the water-soluble polymer A3 was added in an amount of 1% by mass relative to the mass of the negative electrode active material.

Example 7

A negative electrode and a battery were produced in the same manner as in Example 3 except that, in preparing a negative electrode mixture slurry, a negative electrode binder composition a3 was mixed such that the water-soluble polymer A3 was added in an amount of 5% by mass relative to the mass of the negative electrode active material.

Example 8

A negative electrode and a battery were produced in the same manner as in Example 3 except that the ratio of artificial graphite to $SiO_x$ mixed in a negative electrode active material was changed to 95:5.

Example 9

A negative electrode and a battery were produced in the same manner as in Example 3 except that the ratio of artificial graphite to $SiO_x$ mixed in a negative electrode active material was changed to 70:30.

Example 10

A negative electrode and a battery were produced in the same manner as in Example 3 except that lithium nickel cobalt aluminum oxide ($LiNi_{0.89}Co_{0.08}Al_{0.03}O_2$:NCA) was used instead of LCO as a positive electrode active material and, in preparing a negative electrode mixture slurry, styrene butadiene copolymer (SBR) was added and the ratio of artificial graphite to $SiO_x$ mixed in a negative electrode active material was changed to 80:20.

Comparative Examples 1 and 2

Negative electrode binder compositions b1 and b2 were prepared in the same manner as in Example 1 except that the monomers in Table 1 were used at the proportions shown in Table 1. Negative electrodes and batteries were produced in the same manner as in Example 1 except that the negative electrode binder compositions b1 and b2 were used instead of the negative electrode binder composition a1. In Comparative Example 2, in preparing the negative electrode binder composition b2, polyethylene glycol diacrylate (PEGDA, LIGHT ACRYLATE 9EG-A available from Kyoeisha Chemical Co., Ltd.), a bifunctional (meth)acrylate monomer, was used.

Comparative Example 3

A negative electrode and a battery were produced in the same manner as in Example 1 except that an aqueous solution of polyacrylic acid (available from Sigma-Aldrich Co. LLC., weight-average molecular weight=450,000, the pH of an 1% (by mass) aqueous solution was adjusted to 8 by using NaOH (available from Wako Pure Chemical Industries, Ltd., special grade) was used as a negative electrode binder composition.

Comparative Example 4

A negative electrode and a battery were produced in the same manner as in Comparative Example 3 except that lithium nickel cobalt aluminum oxide ($LiNi_{0.89}Co_{0.08}Al_{0.03}O_2$:NCA) was used instead of LCO as a positive electrode active material and, in preparing a negative electrode mixture slurry, styrene butadiene copolymer (SBR) was added and the ratio of artificial graphite to $SiO_x$ mixed in a negative electrode active material was changed to 80:20.

By the following methods, the viscosity of an aqueous solution containing 1% by mass of each water-soluble polymer in terms of solid content produced in Examples and Comparative Examples (viscosity for 1% by mass of solid content), the yield stress in stiffness testing of each negative electrode (stiffness yield stress), the amount of gas generated during storage of each battery in a charged state (storage stability), and the capacity retention after 40 cycles (cycle life) were evaluated, and the evaluation results are shown in Tables 1 and 2.

[Viscosity for 1% by Mass of Solid Content]

The solid content of each negative electrode binder composition was adjusted to 1% by mass by addition of water to obtain a test sample. The viscosity of the test sample was measured with a rotation-type rheometer MCR 30 (available from Anton Paar Japan K.K.) under conditions of a temperature of 25° C. and a shear rate of 40 (l/s).

[Stiffness Yield Stress]

(1) An electrode plate test piece was produced by cutting, into a length of 5 cm, a portion of the negative electrode on which the negative electrode mixture layer was formed. Each end of the electrode plate test piece was attached to a side surface of a glass plate with a width of 2 cm to form an arch body with a diameter of 2 cm. (2) The arch body of the electrode plate test piece was placed between an upper plate movable vertically and a lower plate having a fixture. (3) The arch body was pressed from its outer surface by moving the upper plate downward at a rate of 20 mm/min. At this time, the stress generated in the arch body was measured to obtain an inflection point at which the stress decreases steeply. The stress generated when the inflection point was obtained was calculated. The stress is a yield stress.

[Amount of Generated Gas (Storage Stability)]

After injection of the electrolyte solution, the battery that had been left to stand at a temperature of 25° C. for 5 hours was charged to a battery voltage of 3.65 V at a constant current of 0.2 C and a temperature of 25° C. and then aged at a temperature of 60° C. for 12 hours. The battery was then discharged to a battery voltage of 2.75 V at a constant current of 0.2 C and a temperature of 25° C. Subsequently, the battery was subjected to CC-CV charging (maximum battery voltage: 4.30 V) at a constant current of 0.2 C and subjected to CC discharging to a battery voltage of 3.00 V at a constant current of 0.2 C. Next, the volume (V0) of the battery was calculated on the basis of Archimedes' principle. The battery was then charged to a battery voltage of 4.40 V at a constant current of 0.2 C and a temperature of 25° C. and left to stand under a condition of a temperature of 80±2° C. for 3 days. The battery was then discharged to a battery voltage of 3.00 V at a constant current of 0.2 C and a temperature of 25° C. Subsequently, the volume (V1) of the battery was measured to obtain the amount of generated gas represented by the amount of generated gas $\Delta V$ (mL)=V1 (mL)−V0 (mL). A smaller amount of generated gas indicates better storage stability (stability during high-temperature storage in a charged state).

[Capacity Retention after 40 Cycles (Cycle Life)]

After injection of the electrolyte solution, the battery that had been left to stand at a temperature of 25° C. for 5 hours was charged to a battery voltage of 3.65 V at a constant current of 0.2 C and a temperature of 25° C. and then aged at a temperature of 60° C. for 12 hours. The battery was then discharged to a battery voltage of 3.00 V at a constant current of 0.2 C and a temperature of 25° C. Subsequently, the battery was subjected to CC-CV charging (maximum battery voltage: 4.30 V) at a constant current of 0.2 C and subjected to CC discharging to 3.00 V at a constant current of 0.2 C. The battery was then subjected to 40 cycles of charging and discharging at a charge/discharge rate of 1.0 C and a battery voltage from 4.30 to 3.00 V in an environment at a temperature of 25° C. Then, the capacity at the first cycle, that is, the initial discharge capacity X1, and the discharge capacity X2 at the 40th cycle were measured to obtain the capacity retention represented by $\Delta C'=(X2/X1)\times 100(\%)$.

TABLE 1

| | | | Example 1 | Example 2 | Example 3 | Example 4 | Example 5 | Comparative Example 1 | Comparative Example 2 | Comparative Example 3 |
|---|---|---|---|---|---|---|---|---|---|---|
| water-soluble polymer | monomer content (parts by mass per 100 parts by mass of all monomers) | acrylic acid | 23.51 | 25 | 25 | 25 | 25 | 99.5 | 25 | 100 |
| | | EPETA (tetrafunctional) | 1.69 | 0.2 | 0.5 | 1.8 | 1.8 | 0.5 | 1 | 0 |
| | | acrylamide | 70.1 | 74.8 | 74.5 | 68.2 | 73.2 | 0 | 69 | 0 |
| | | methyl acrylate | 4.7 | 0 | 0 | 5 | 0 | 0 | 0 | 0 |
| | | PEGDA (bifunctional) | 0 | 0 | 0 | 0 | 0 | 0 | 5 | 0 |
| | amount of monomer unit (mol/100 g) | acrylic acid monomer unit | 0.327 | 0.347 | 0.347 | 0.347 | 0.347 | 1.382 | 0.347 | 1.389 |
| | | tetrafunctional (meth)acrylate monomer unit | $8.93 \times 10^{-4}$ | $1.06 \times 10^{-4}$ | $2.64 \times 10^{-4}$ | $9.51 \times 10^{-4}$ | $9.51 \times 10^{-4}$ | $2.64 \times 10^{-4}$ | $5.29 \times 10^{-4}$ | 0 |
| | viscosity (Pa · s) for 1% by mass of solid content | | 0.35 | 0.056 | 0.13 | 0.64 | 0.3 | 0.91 | 1.65 | 0.09 |
| | addition amount (relative to negative electrode active material, % by mass) | | 3 | 3 | 3 | 3 | 3 | 3 | 3 | 3 |
| | stiffness yield stress (mN) | | 168 | 158 | 160 | 190 | 176 | 122 | 191 | 85 |
| | amount of generated gas (mL) | | 2.4 | 2.4 | 2.5 | 3.1 | 3.4 | 3.0 | 4.0 | 4.2 |
| | capacity retention (%) after 40 cycles | | 91.3 | 92.1 | 92.9 | 93.6 | 91.8 | 90.7 | 92.0 | 89.7 |

TABLE 2

| | | | Example 3 | Example 6 | Example 7 | Example 8 | Example 9 | Example 10 | Comparative Example 4 |
|---|---|---|---|---|---|---|---|---|---|
| water-soluble polymer | monomer content (parts by mass per 100 parts by mass of all monomers) | acrylic acid | 25 | ← | ← | ← | ← | ← | 100 |
| | | EPETA (tetrafunctional) | 0.5 | ← | ← | ← | ← | ← | 0 |
| | | acrylamide | 74.5 | ← | ← | ← | ← | ← | 0 |
| | | methyl acrylate | 0 | ← | ← | ← | ← | ← | ← |

TABLE 2-continued

| | | Example 3 | Example 6 | Example 7 | Example 8 | Example 9 | Example 10 | Comparative Example 4 |
|---|---|---|---|---|---|---|---|---|
| amount of monomer unit (mol/100 g) | PEGDA (bifunctional) | 0 | ← | ← | ← | ← | ← | ← |
| | acrylic acid monomer unit | 0.347 | ← | ← | ← | ← | ← | 1.389 |
| | tetrafunctional (meth)acrylate monomer unit | $2.64 \times 10^{-4}$ | ← | ← | ← | ← | ← | 0 |
| viscosity (Pa·s) for 1% by mass of solid content | | 0.13 | ← | ← | ← | ← | ← | 0.91 |
| addition amount (relative to negative electrode active material, % by mass) | | 3 | 1 | 5 | 3 | ← | ← | ← |
| SBR (relative to negative electrode active material, % by mass) | | 0 | ← | ← | ← | ← | 1 | 1 |
| graphite/$SiO_x$ (mass ratio) | | 90/10 | ← | ← | 95/5 | 70/30 | 80/20 | ← |
| positive electrode active material | | LCO | ← | ← | ← | ← | NCA | ← |
| stiffness yield stress (mN) | | 160 | 135 | 190 | 165 | 160 | 299 | 146 |
| amount of generated gas (mL) | | 2.5 | 1.3 | 2.5 | 2.8 | 2.9 | 9.0 | 11.1 |
| capacity retention (%) after 40 cycles | | 92.9 | 91.5 | 93.5 | 93.3 | 89.0 | 90.0 | 83.0 |

As shown in Table 1, the batteries of Examples 1 to 5 have a long cycle life because the capacity retention after 40 cycles is higher than those of the batteries of Comparative Examples 1 and 3. The batteries of Examples 1 to 5 further have high storage stability because the amount of gas generated during storage in a charged state (during high-temperature storage) is smaller than those for the batteries of Comparative Examples 2 and 3. The battery of Comparative Example 1 has high storage stability but has a poor cycle life, whereas the battery of Comparative Example 2 has a long cycle life but has low storage stability. The battery of Comparative Example 3 in which polyacrylic acid is used as a negative electrode binder has a poor cycle life and low storage stability. In short, the batteries of Examples 1 to 5 have both a long cycle life and high storage stability.

As shown in Table 2, in the cases (Examples 6 and 7) where the amount of the water-soluble polymer added is changed and the cases (Examples 8 and 9) where the ratio of graphite to $SiO_x$ mixed in the negative electrode active material is changed, the capacity retention after 40 cycles is high, and the amount of gas generated during storage in a charged state (during high-temperature storage) is small. Although the battery of Example 9 exhibits a capacity retention of 89.0%, this capacity retention is regarded as a reasonable value in consideration of addition of 30% by mass of $SiO_x$. In the case (Example 10) where the type of positive electrode active material and the ratio of graphite to $SiO_x$ mixed in the negative electrode active material are changed and SBR is used as a negative electrode binder in combination with graphite and $SiO_x$, the battery has a longer cycle life and higher storage stability than the corresponding battery of Comparative Example 4.

REFERENCE SIGNS LIST

10 Non-aqueous electrolyte secondary battery, 11 Positive electrode, 12 Negative electrode, 13 Separator, 14 Electrode body, 15 Case body, 16 Sealing body, 17, 18 Insulating plate, 19 Positive electrode lead, 20 Negative electrode lead, 21 Projecting portion, 22 Filter, 22a Filter opening, 23 lower valve body, 24 Insulating member, 25 Upper valve body, 26 Cap, 26a Cap opening, 27 Gasket, 33 Negative electrode current collector, 34 Negative electrode mixture layer, 35 Carbon-based active material, 36 Silicon-based active material

The invention claimed is:

1. A non-aqueous electrolyte secondary battery comprising a positive electrode, a negative electrode, and a non-aqueous electrolyte, wherein
the negative electrode includes a negative electrode current collector and a negative electrode mixture layer formed on the current collector,
the negative electrode mixture layer contains a water-soluble polymer and a negative electrode active material containing a silicon-based active material,
the water-soluble polymer includes 70% by mass or more of acrylamide, 0.30 mol/100 g or more and 0.40 mol/100 g or less of an acrylic acid monomer unit and $10^{-4}$ mol/100 g or more and $10^{-3}$ mol/100 g or less of a tetrafunctional (meth)acrylate monomer unit, and an aqueous solution containing 1% by mass of the polymer in terms of solid content has a viscosity of 0.05 Pa·s or higher and 0.70 Pa·s or lower.

2. The non-aqueous electrolyte secondary battery according to claim 1, wherein the negative electrode active material further contains a carbon-based active material.

3. The non-aqueous electrolyte secondary battery according to claim 2, wherein a mass ratio of the carbon-based active material to the silicon-based active material is from 95:5 to 70:30.

4. The non-aqueous electrolyte secondary battery according to claim 1, wherein the water-soluble polymer includes $2.0 \times 10^{-4}$ mol/100 g or more and $9.0 \times 10^{-4}$ mol/100 g or less of the tetrafunctional (meth)acrylate monomer unit.

5. The non-aqueous electrolyte secondary battery according to claim 1, wherein the water-soluble polymer includes 0.32 mol/100 g or more and 0.35 mol/100 g or less of the acrylic acid monomer unit.

6. The non-aqueous electrolyte secondary battery according to claim 1, wherein the aqueous solution containing 1% by mass of the water-soluble polymer in terms of solid content has a viscosity of 0.10 Pa·s or higher and 0.65 Pa·s or lower.

7. The non-aqueous electrolyte secondary battery according to claim 1, wherein an amount of the water-soluble polymer is 1% to 7% by mass relative to a mass of the negative electrode active material.

* * * * *